United States Patent
Davidson et al.

(10) Patent No.: US 10,565,753 B2
(45) Date of Patent: Feb. 18, 2020

(54) METHOD AND APPARATUS FOR GENERATING AN IMAGE

(71) Applicant: BAE SYSTEMS plc, London (GB)

(72) Inventors: Neil Turnbull Davidson, Rochester Kent (GB); Ian Gray Rigge, Rochester Kent (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 16/075,282

(22) PCT Filed: Feb. 3, 2017

(86) PCT No.: PCT/GB2017/050271
§ 371 (c)(1),
(2) Date: Aug. 3, 2018

(87) PCT Pub. No.: WO2017/134452
PCT Pub. Date: Aug. 10, 2017

(65) Prior Publication Data
US 2019/0066347 A1 Feb. 28, 2019

(30) Foreign Application Priority Data
Feb. 5, 2016 (GB) .................................. 1602120.6

(51) Int. Cl.
*G06T 11/40* (2006.01)
*G06T 11/00* (2006.01)
(Continued)

(52) U.S. Cl.
CPC ................ *G06T 11/40* (2013.01); *G06T 1/60* (2013.01); *G09G 5/022* (2013.01); *G09G 5/026* (2013.01);
(Continued)

(58) Field of Classification Search
CPC combination set(s) only.
See application file for complete search history.

(56) References Cited

U.S. PATENT DOCUMENTS

| 7,075,681 | B1 * | 7/2006 | Brothers | ................ H04N 1/644 |
| | | | | 358/426.01 |
| 7,227,556 | B2 * | 6/2007 | O'Driscoll | ............ G06T 11/203 |
| | | | | 345/443 |

(Continued)

FOREIGN PATENT DOCUMENTS

| WO | 02/103292 A1 | 12/2002 |
| WO | 2008/048949 A2 | 4/2008 |

(Continued)

OTHER PUBLICATIONS

GB Search Report under Section 17(5) received for GB Application No. 1602120.6, dated Jul. 5, 2016. 3 pages.

(Continued)

*Primary Examiner* — Wesner Sajous
(74) *Attorney, Agent, or Firm* — Finch & Maloney PLLC

(57) ABSTRACT

A method and apparatus are provided for generating image data for output to a display device such as an HUD or HMD defining pixels of an image for display. The image data for each pixel defines a predetermined background colour or a non-background colour. In an example implementation, the image generator comprises at least one image rendering module and a memory accessible by the at least one rendering module providing at least one frame buffer in which image data may be assembled. The at least one rendering module is arranged to process or to generate image data using a tile representation of an image for display, each tile comprising image data defining each of a predetermined number of pixels of the image. Furthermore, the at least one rendering module is arranged to store image data for the pixels of a tile in the at least one frame buffer only in the (Continued)

event that one or more pixels of the tile have respective image data defining a non-background colour or are enabled for display with a non-background colour, the pixels in the tile being otherwise assumed to be intended for display with the predetermined background colour. In this way the need to transfer data to and from the memory when generating and assembling image data is reduced, so reducing image rendering time.

34 Claims, 6 Drawing Sheets

(51) Int. Cl.
| | | |
|---|---|---|
| G06T 1/20 | (2006.01) | |
| G06T 15/00 | (2011.01) | |
| G09G 3/00 | (2006.01) | |
| G09G 5/00 | (2006.01) | |
| G09G 5/02 | (2006.01) | |
| G09G 5/06 | (2006.01) | |
| G09G 5/36 | (2006.01) | |
| G06T 1/60 | (2006.01) | |

(52) U.S. Cl.
CPC ....... *G09G 5/363* (2013.01); *G09G 2360/121* (2013.01); *G09G 2380/12* (2013.01)

(56) References Cited

U.S. PATENT DOCUMENTS

| | | |
|---|---|---|
| 9,430,036 B1 | 8/2016 | Kominac et al. |
| 2004/0179018 A1* | 9/2004 | Sabella ................. G09G 5/393 345/536 |
| 2005/0027988 A1 | 2/2005 | Bodrov |
| 2007/0013693 A1 | 1/2007 | Hedrick |
| 2007/0046680 A1 | 3/2007 | Hedrick et al. |
| 2008/0205853 A1 | 8/2008 | Schroder et al. |
| 2010/0231600 A1* | 9/2010 | Kaufman ............... G09G 5/393 345/545 |
| 2011/0074765 A1 | 3/2011 | Oterhals et al. |
| 2012/0206447 A1* | 8/2012 | Hutchins ............... G06T 15/005 345/419 |
| 2012/0293545 A1 | 11/2012 | Engh-Halstvedt et al. |
| 2014/0085324 A1 | 3/2014 | Charvet et al. |
| 2014/0146075 A1 | 5/2014 | Takasu |
| 2014/0375661 A1 | 12/2014 | Koker et al. |
| 2015/0015588 A1 | 1/2015 | Guy |
| 2015/0188977 A1 | 7/2015 | Berry et al. |
| 2015/0332429 A1 | 11/2015 | Fernandez et al. |
| 2015/0348299 A1 | 12/2015 | Ott |
| 2016/0077896 A1* | 3/2016 | Bolz ........................ G06F 9/54 719/328 |
| 2017/0177458 A1 | 6/2017 | Viggers et al. |

FOREIGN PATENT DOCUMENTS

| | | |
|---|---|---|
| WO | 2017/134451 A1 | 8/2017 |
| WO | 2017/134452 A1 | 8/2017 |

OTHER PUBLICATIONS

International Search Report and Written Opinion received for PCT Application No. PCT/GB2017/050271. dated Apr. 20, 2017. 15 pages.
GB Search Report under Section 17(5) received for GB Application No. 1602117.2 dated Aug. 3, 2016. 3 pages.
International Search Report and Written Opinion received for PCT Application No. PCT/GB2017/050270. dated May 9, 2017. 17 pages.
International Preliminary Report on Patentability received for PCT Application No. PCT/GB2017/050271. dated Aug. 16, 2018. 9 pages.
International Preliminary Report on Patentability received for PCT Application No. PCT/GB2017/050270. dated Aug. 16, 2018. 11 pages.

* cited by examiner

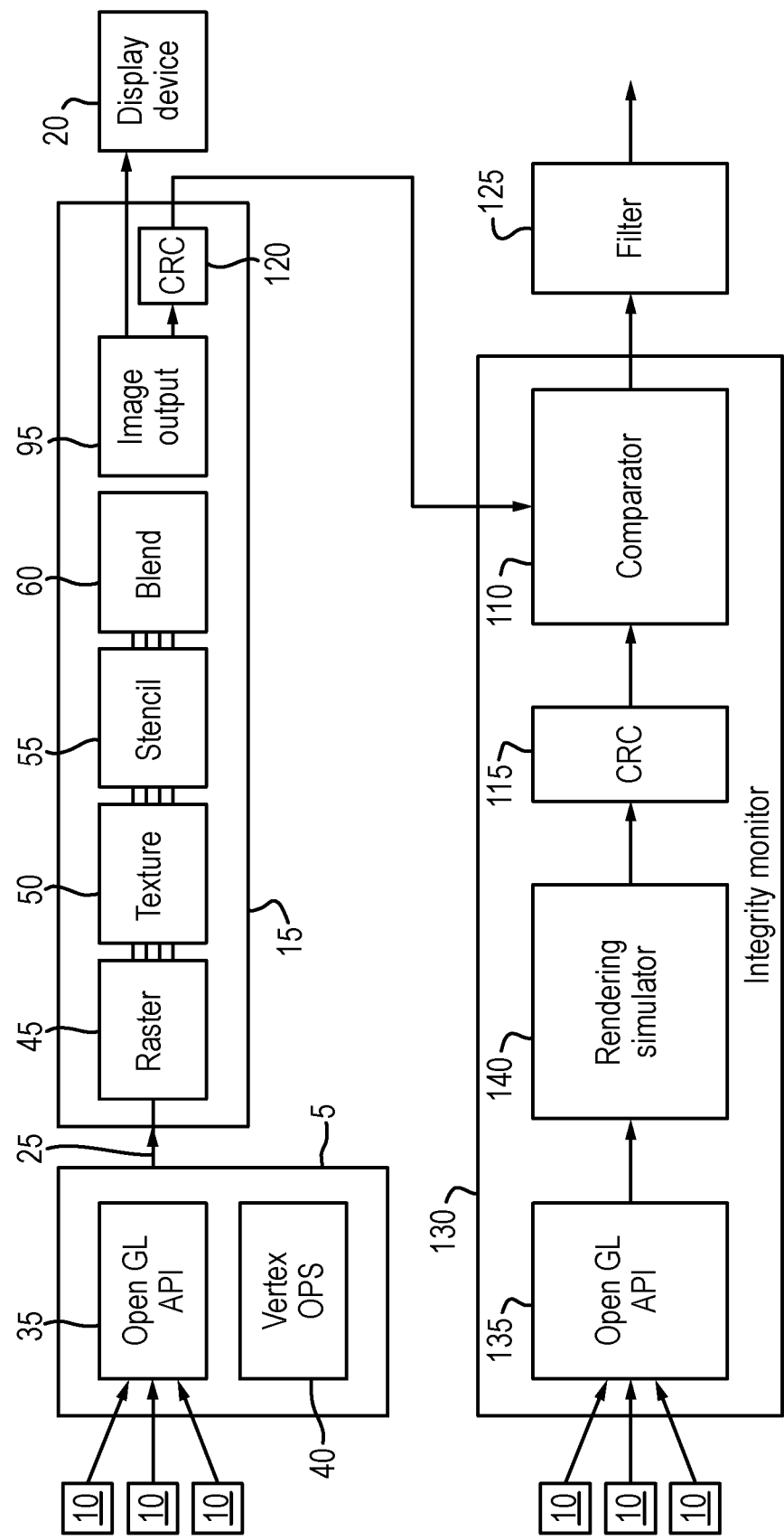

METHOD AND APPARATUS FOR GENERATING AN IMAGE

FIELD OF THE INVENTION

This invention relates to the generation of images for display. In particular, the invention may be applied to the generation of images for display by see-through displays, such as head-up displays (HUDs) and head or helmet-mounted displays (HMDs). The invention is also applicable to the generation of images for display by any graphical display device where a majority of an image is to be displayed using a uniform background colour.

BACKGROUND TO THE INVENTION

Head-up display units (HUDs) and helmet-mounted display units (HMDs) display information in a user's field of vision without requiring the user to move his or her head. They are of particular use in safety-critical environments, for example in military aircraft cock-pits where it is desirable that the aircrew, and especially the pilot(s), are provided with flight-critical information without having to look at instruments or otherwise divert their line of sight from an external scene. As a display enhances or supplements the user's view of an external world scene, an important feature is that most of the display is see-through, so that the world view is not unduly obscured. The skilled person will be familiar with the type of avionic information and symbology typically included in images for display by HUDs and HMDs when used by aircraft pilots, for example. As such displays provide real-time information and symbology, image updates need to be generated for display at a high rate and with low latency.

Typically, image generators use a graphics processor unit (GPU) for image generation. While able to provide good performance, GPUs can be power-hungry, difficult to certify to the required design assurance level (DAL) and have a short lifespan as compared to typical avionic product life times of 25 or more years. This may result in obsolescence replacement programs, and expensive re-certification of the avionics following a design change.

An implementation for an image generator is therefore required that combines relative ease of certification to the required standards with a required level of performance defined in terms of overall latency of an associated display system from receipt of data to be displayed to visibility of updated imagery on the display device. One contributing element to the overall latency of the display system is the time required to render images defined in drawing commands received by the image generator. The present invention addresses the latter aspect.

SUMMARY OF THE INVENTION

According to a first aspect, the invention provides an image generator for generating image data defining pixels of an image for output to a display device, the image data for each pixel defining a background colour or a non-background colour, the image generator comprising:

at least one image rendering module arranged to apply received image rendering commands to process or to generate image data defining pixels according to a division of an image area of an associated display device into a plurality of tiles, each tile comprising a predetermined number of pixels assumed initially to be of the background colour;

a memory; and an image output module, wherein the at least one rendering module is arranged to store image data for a tile in the memory only for those tiles comprising at least one pixel whose colour has been changed by the at least one rendering module to be a non-background colour, and wherein the image output module is arranged to assemble image data for output, comprising image data retrieved from the memory for those tiles having at least one pixel of a non-background colour combined with image data defining pixels of the background colour assumed for all other tiles.

The background colour value may be selected to be substantially invisible when viewed against an external scene. For this reason, black may be a suitable background colour, corresponding to an off (transparent) state for pixels in those regions of a generated image intended to be background-coloured. However, in some applications, a background colour different to black may be appropriate.

In an example embodiment, the at least one rendering module is provided with access to a cache comprising a plurality of cache cells, each cell being configured for storing image data for pixels of one tile, and the at least one rendering module is arranged to change the colour of a pixel by storing image data for pixels of a respective tile in a cell of the cache and changing the image data for the pixel when stored in the cell of the cache.

In an example embodiment, the at least one rendering module is arranged, when transferring image data between the cache and the memory, to a transfer image data for the pixels of an entire tile. This is intended to reduce the need to transfer data between the cache and the frame buffer, in particular where a succession of received pixels are within the same tile.

In a further attempt to reduce the need to access external memory, the at least one rendering module is arranged to modify the image data of a pixel when the respective tile is stored in the cache. In particular, the at least one rendering module is arranged, if the colour of a pixel in a tile is to be changed, to determine if the respective image data for pixels of the tile are stored in the memory and, if so, to transfer the stored image data to a cell in the cache before changing the image data for the pixel.

In an example embodiment, the cache is a direct-mapped cache such that the at least one rendering module is arranged to store image data for pixels of a tile in a predetermined one of the plurality of cache cells. This method of relating cache cells to particular tiles reduces the number of addressing bits needed to determine which cache cell to look in for an already stored tile or in which to write data for a tile to be modified.

In an example embodiment, each cache has associated therewith a respective cache index storing, for each cell in the cache:

an identifier for a tile of image data currently stored in the cell; and an indication of whether or not a tile of image data stored in the cell defines one or more pixels of a non-background colour.

The identifier for a tile may comprise a start address allocated for the tile in at least one frame buffer in the memory such that the at least one rendering module may store the cached tile image data in the frame buffer in consecutive memory locations beginning at the allocated start address if the image data defines one or more pixels of a non-background colour In particular, the allocated start address for the tile, and hence the identifier for the tile, is an address defined relative to an address allocated for the at least one frame buffer in the memory. This enables a reduced number of addressing bits to be stored and used when tile data are being read from and written to a frame buffer.

Alternatively, the identifier for a tile comprises a unique tile number for the tile in the image area. In that example, the at least one rendering module is arranged to determine, from the unique tile number, a respective start address in at least one frame buffer in the memory such that the at least one rendering module may store the cached tile image data in the frame buffer in consecutive memory locations beginning at the determined start address if the tile image data defines one or more pixels of a non-background colour.

In an example embodiment, as an alternative to using pre-allocated frame buffer storage in a memory, a smaller memory may be utilised if the at least one rendering module is arranged, if the tile image data stored in the cell defines one or more pixels of a non-background colour, to determine a reference and hence a start address for a next available block of tile storage space in a pre-defined pool of tile storage space in the memory, to store the image data for the tile in the memory beginning at the determined start address and to store the determined reference in a respective record for the tile in an indirection buffer index. In that way, memory is used only for tiles that have been written to by a rendering module.

Before rendering begins, any type of buffer index in use is initialised to indicate that all tiles in an image comprise pixels of the background colour, as an initial assumption. This is done on the assumption that an image will be re-drawn for each new image frame period with no re-use of pixel data from a preceding frame period. However, in other embodiments, pixel data from a preceding frame period may be re-used in a current frame period.

In an example embodiment, the at least one frame buffer has associated therewith a respective buffer index comprising an indication, for each tile in the image area, of whether or not respective image data have been changed by the at least one rendering module for a current frame to define at least one pixel in the tile of a non-background colour. The buffer index provides two opportunities to reduce latency in the image generator: firstly by enabling a rendering module to determine whether the data for a tile are stored in the frame buffer without needing to access the frame buffer itself; and secondly when assembling an image for output, the buffer index indicates which tiles have data stored in the frame buffer that include non-background coloured pixels. Tile data needs to be retrieved from the frame buffer only for those tiles, all other tiles being assumed to comprise pixels of the background colour, so saving on memory accesses.

In an example embodiment, if the cache index indicates that the tile currently stored in the cache cell associated with the tile of a pixel to be modified is not the tile of the pixel to be modified, and that the tile currently stored in the associated cache cell has been modified while it has been stored therein, then the at least one rendering module is arranged to copy the tile currently stored in the associated cache cell to a respective frame buffer and updates the associated buffer index.

Alternatively, if the cache index indicates that the tile of a pixel to be modified is not stored in the associated cache cell, the at least one rendering module is arranged to access a respective frame buffer index to determine if the tile is currently stored in the associated frame buffer and, if stored therein, to copy the tile to the associated cache cell. If the respective frame buffer index indicates that the tile is not stored in the associated frame buffer, then the cache cell and the respective contents of the cache index are initialised for the tile.

This use of cache indices and buffer indices enables the need for direct access to frame buffer contents to be minimised.

In an example embodiment, when image rendering has been completed for a current frame period, the at least one rendering module is arranged to access the cache index and to copy each tile stored in the cache to a respective frame buffer if the cache index indicates that the tile has been modified while stored in the cache.

With any modified tile data now in the respective frame buffer, an image output module is arranged to access the buffer index associated with the at least one frame buffer and to assemble image data for the pixels of an image by copying data from the frame buffer only for those tiles which the buffer index indicates include at least one pixel of a non-background colour, setting all other pixels in the remaining tiles of the image to the predetermined background colour.

In an example embodiment, designed to tune the performance of the image generator, the predetermined number of pixels in a tile is selected to reduce cache management requirements. Furthermore a tile comprises a block of pixels of the predetermined number of pixels in a rectangular arrangement, the arrangement being selected to achieve both an increase the potential rate of data transfer for a tile of image data between a cache and a respective frame buffer and an increase in the probability that a pixel to be modified by the at least one rendering module is a pixel of a tile currently stored in the cache. A tile of image data defining 64 pixels in a rectangular arrangement of 16 pixels by 4 pixels has been found beneficial.

In an example implementation, the memory is implemented using a double data rate (DDR) type of memory device and a tile is copied between a cache and a respective frame buffer as a 'burst' transfer of data. Furthermore, the image generator may have a software-implemented component providing an interface for receiving drawing commands from one or more external sources defining at least a portion of an image to be displayed, and the at least one rendering component is implemented as a module of a firmware-implemented component for receiving commands over an interface established with the software-implemented component, to render the image according to the received drawing commands.

In order to reduce the functional complexity of the image generator for a given application, the drawing commands comprise commands of a selected subset of a predefined graphics standard, wherein the selected subset includes commands for generating only those image artefacts likely to be required in displayed images in a selected application.

In avionic applications of the present invention, in particular, when certification of the design of critical components is required to predetermined standards, the image generator in a further example embodiment further comprises a separate integrity monitor having:

an input for receiving, in respect of a selected frame period, the drawing commands as received either by the firmware component from the software-implemented component or from the one or more external source systems;

a rendering simulator for simulating functionality of the at least one rendering module and for generating image data intended to be comparable to the image data generated by the firmware component, to bit-accuracy; and a comparator for comparing image data generated by the rendering simulator for the selected frame period with image data output by the firmware component for the same selected frame period and for outputting a signal indicative of any discrepancy.

Advantageously, the firmware component further comprises a module for generating a cyclic redundancy check (CRC) value or other form of digital signature for each set of image data output by the firmware component, and the integrity monitor includes a functionally similar module for generating a CRC value or other form of digital signature for image data output by the rendering simulator and the comparator is arranged to compare the generated CRC values or digital signatures to identify whether or not the respective sets of image data are identical and to output said signal if there is a discrepancy.

In an example embodiment, a filter may be provided to filter the signals output by the comparator thereby to suppress indications of transitory hardware or similar faults unlikely to affect safety.

According to a second aspect of the invention, having embodiments providing equivalent advantages to those provided by corresponding features of the image generator apparatus according to the first aspect outlined above, there is provided a method of generating image data defining pixels of an image for display, the image data for each pixel defining a background colour or a non-background colour, the method comprising the steps:

(i) receiving one or more image rendering commands and data identifying a pixel of an image to be displayed;

(ii) identifying a tile, in a tile representation of the image, that includes the pixel, wherein each tile in the tile representation comprises image data defining each of a predetermined number of pixels of the image;

(iii) applying at least one type of image rendering functionality to apply the one or more received image rendering commands to the data identifying a pixel to generate image data defining the pixel to be displayed; and (iv) assembling image data for the image in a memory, wherein image data for the identified tile are stored in the memory only in the event that the at least one type of rendering functionality changes at least one pixel of the tile to have, or to be enabled for display with, a non-background colour, the pixels in the tile being otherwise assumed to be intended for display with the background colour.

In an example embodiment of the method, at step (iii), the tile is stored in a cache associated with the at least one type of rendering functionality such that image data may be changed by said functionality for one or more pixels of the tile when held in the cache. The cache may be a direct-mapped cache comprising a plurality of cache cells, the image data for each tile being designated for storage in a predetermined one of the plurality of cache cells and wherein, at step (ii), identifying the tile also includes identifying a respective cache cell in the direct-mapped cache.

In a further example embodiment of the method, at step (iii), the at least one type of rendering functionality is arranged to maintain a cache index associated with the cache, the cache index configured to store, for each cache cell:

an identifier for a tile stored in the cache cell; and an indication of whether or not a tile stored in the cache cell includes one or more pixels to be displayed with other than the predetermined background colour.

The identifier for a tile may comprise a start address allocated for the tile in the memory and step (iv) includes storing image data for the tile in consecutive memory locations beginning at the allocated start address if the tile includes at least one pixel for display with a non-background colour. Advantageously, the allocated start address for the tile, and hence the identifier for the tile, is an address defined relative to an address allocated for the at least one frame buffer in the memory.

In a further example embodiment of the method, step (iv) includes storing, in a buffer index associated with the at least one frame buffer, an indication for each tile of an image of whether or not the tile includes at least one pixel of a non-background colour.

In a further example embodiment of the method, the identifier for a tile comprises a unique tile number for the tile. Step (iv) may than include determining, from the unique tile number, a respective start address in at least one frame buffer in the memory and, if the tile image data stored in the cache cell defines one or more pixels of a non-background colour, storing the cached tile image data in the frame buffer in consecutive memory locations beginning at the determined start address. Alternatively, step (iv) includes, if the tile image data stored in the cache cell defines one or more pixels of a non-background colour, determining a reference and hence a start address for a next available block of tile storage space in a pre-defined pool of tile storage space in the memory, storing the image data for the tile in the memory beginning at the determined start address and storing the determined reference in a respective record for the tile in an indirection buffer index.

In either example of the use of a buffer index, step (i) includes initialising each buffer index to indicate that all tiles comprise pixels of the background colour.

In further example embodiments of the method, at step (iii), if the cache index shows that a different tile is stored in the respective cache cell, and that the different tile stored in the cache cell has been modified while stored in the cache cell, the at least one type of rendering functionality copies the different tile from the cache cell to the at least one frame buffer and updates the associated buffer index. Furthermore, at step (iii), if the cache index indicates that the tile of a pixel to be modified is not stored in the associated cache cell, the at least one rendering module is arranged to access a respective frame buffer index to determine if the tile is currently stored in the associated frame buffer and, if stored therein, to copy the tile to the associated cache cell. However if, at step (iii), the respective frame buffer index indicates that the tile is not stored in the associated frame buffer, then the cache cell and the respective contents of the cache index are initialised for the tile.

In an example embodiment of the method, at step (iv), when image rendering has been completed for a current frame period, the at least one rendering module is arranged to access the cache index and to copy each tile stored in the cache to a respective frame buffer if the cache index indicates that the tile has been modified while stored in the cache. The method may then include a further step:

(v) generating and outputting image data for an image by retrieving from the memory assembled image data for those tiles having at least one pixel of a non-background colour and combining the retrieved tile image data with data defining all other pixels of all other tiles for display with the background colour.

In an example embodiment of the method, the predetermined number of pixels in a tile is selected to reduce cache management requirements. Furthermore, a tile may comprise a block of pixels of the predetermined number of pixels in a rectangular arrangement, the arrangement being selected to achieve both an increase the potential rate of data transfer for a tile of image data between a cache and a respective frame buffer and an increase in the probability that a pixel to be modified by the at least one rendering module is a pixel of a tile currently stored in the cache. Advantageously, a tile comprises image data defining 64 pixels in a rectangular arrangement of 16 pixels by 4 pixels.

The method as described provides a way of processing image data whereby the memory bandwidth is much reduced compared to methods where data relating to each and every pixel must be stored in a memory. This is especially true when subsequent frames are processed: in other designs it is necessary to clear the entire frame buffer to the background colour before starting. The invention is particularly advantageous for typical HUD and HMD units where fewer than 10 percent, or even fewer than 5 percent of the pixels making up an image are of a non-background colour. The method splits an image into a number of tiles and, of those tiles, data are only stored if any of the pixel values within that tile are of a non-background colour. It is only therefore necessary to store a reduced amount of data. When processing the image, it can be assumed that the value of any pixel within a tile which is not stored in either the cache or the memory, is to be displayed with the background colour. Thus, a method of processing image data is provided that uses a lower memory bandwidth than prior art methods which, in turn, leads to faster processing for an equivalent clock rate. This reduction in processing time/power required may allow for more economical use of computing resources, for example using Field Programmable Gate Arrays (FPGAs) instead of Graphics Processing Units (GPUs).

DESCRIPTION OF THE DRAWINGS

Example embodiments of the present invention will now be described in more detail with reference to the accompanying drawings, of which:

FIG. 6 shows a functional block representation of an alternative implementation of the image generator of FIG. 5 having an Integrity Monitor with increased functionality, according to an example embodiment of the present invention.

DETAILED DESCRIPTION

Display systems intended for avionic use, in particular those likely to be displaying primary flight information, are required to meet stringent safety standards and be certified for such use. Demonstration of a systems' compliance with such standards may be an extremely time-consuming exercise, the cost increasing with the complexity of the system.

A conventional implementation of an image generator may involve the use of a readily available but proprietary graphics processor unit (GPU). However, while such a device is more than capable of generating imagery at a rate required for avionics applications, such a device is typically more complex than required for the relatively simple imagery preferred when displaying flight information. The complexity of a GPU implies that the cost of certification of such a device for avionics use would be prohibitively high for an implementer of an avionics display system, even assuming that sufficient information on the working of the GPU would be available from the proprietor to satisfy the certification authorities as to its reliability.

An alternative, simpler implementation of an avionics display system involves a combination of bespoke software executing on a conventional processor and hardware logic devices such as field-programmable gate array (FPGA) devices to accelerate certain graphics rendering functions and so help to achieve necessary performance requirements. However, while the simpler and more accessible bespoke implementation provides an opportunity to certify the display system for avionics use at a reduced cost compared with one using conventional GPUs, certain additional innovations are required to achieve some of the more stretching performance requirements and to minimise the cost of certification, which even for such a bespoke implementation may be prohibitively high.

Figure 1:
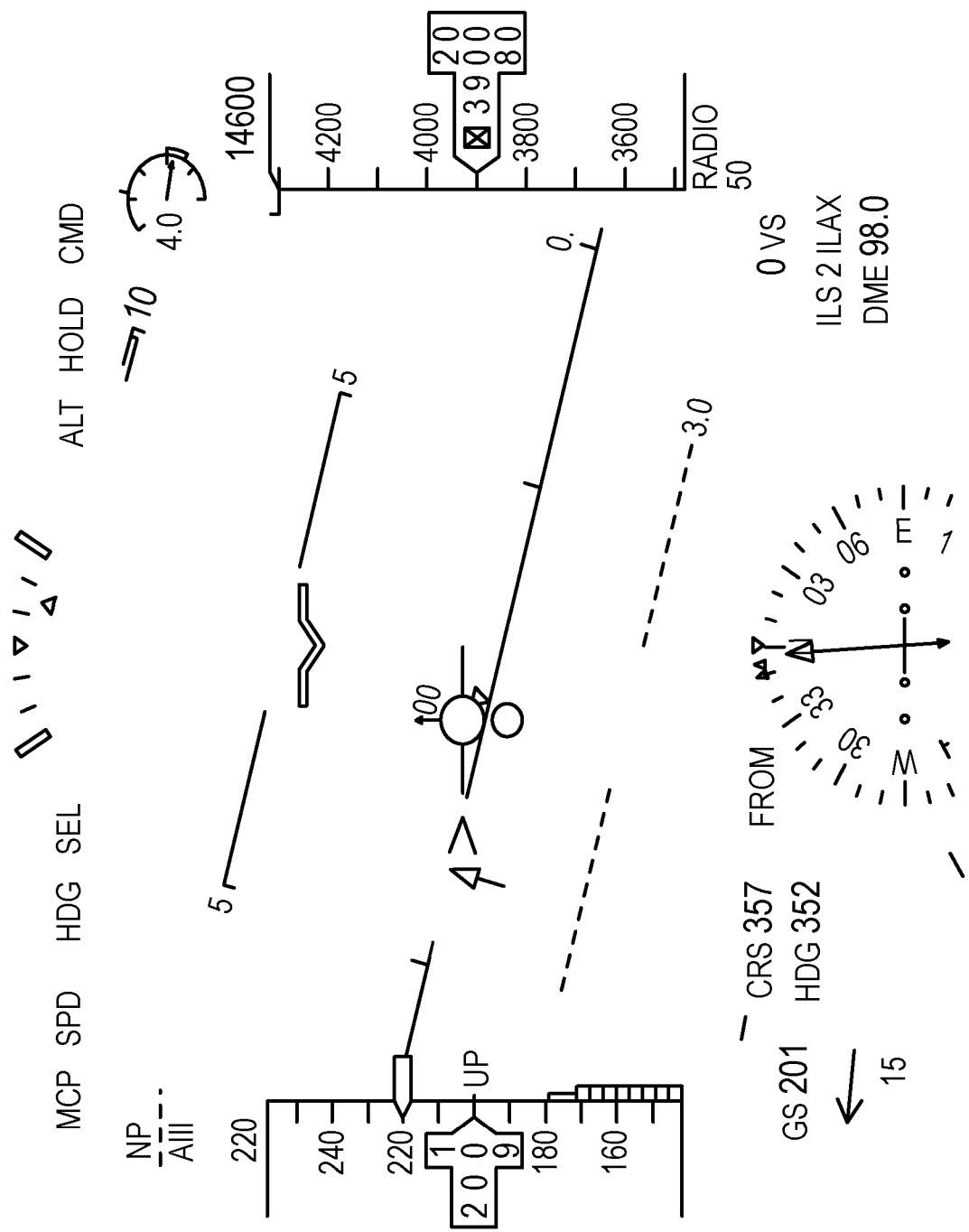
FIG. 1 shows an example image of numbers and symbols as may be displayed, in particular by a HUD, in avionic applications of the present invention.

The inventors of the present invention have recognised that in images of a type typically generated for display in avionic applications of transparent HUDs or HMDs, an example of a typical HUD image being shown in FIG. 1, up to 95% or more of the image area is likely to be of a background colour, e.g. black. Example embodiments of the present invention are designed to exploit this property to reduce the time required to render an image and to reduce the overall latency in generating images for display in avionic HUD/HMD systems in particular. In a typical such application images are generated at a frame rate of 50 or 60 Hz, that is, within a frame period or image refresh period of 20 ms or 16.667 ms, respectively. Within that frame period the present invention aims to reduce the time required to render an image in implementations typical of image generators in avionic display systems. The present invention may however provide advantages in applications other than avionic applications in which a significant proportion of the pixels in an image are to be displayed as a uniform predetermined background colour, whether the display is transparent or opaque.

Further innovations realised through certain design choices, as will be apparent from the description that follows, enable a relatively simple solution to be implemented to validate image rendering functionality of a display system incorporating the present invention, to avionic standards.

Example embodiments of an image generator according to the present invention will be described below comprising a bespoke software-implemented interfacing component, combined with a bespoke image rendering firmware component. Such an implementation enables a system designer to exercise full control over the selection of drawing commands or rendering commands that will be supported over the interfaces and the implementation of a corresponding selection of image rendering functionality. In particular, the image rendering functionality may be limited to the minimum required to generate images of the type expected in the applications intended. In this way, the implementation of an image generator is as simple as it can be, minimising the expected time and cost of certifying a display system incorporating such an image generator. Performance is also increased using innovative techniques to be described in detail below for the management of memory and of memory accesses to facilitate a reduction in the image rendering time in such an implementation.

Example embodiments of the present invention implement a selected subset of OpenGL standard drawing commands, comprising only those commands necessary for generating the types of image artefact typically displayed by avionic HUDs or HMDs. Details of the OpenGL standard may be found for example through the OpenGL foundation web site: www.opengl.org.

An example functional and processing architecture of an image generating apparatus according to an embodiment of the present invention will be described firstly with reference to FIG. 2.

Figure 2:
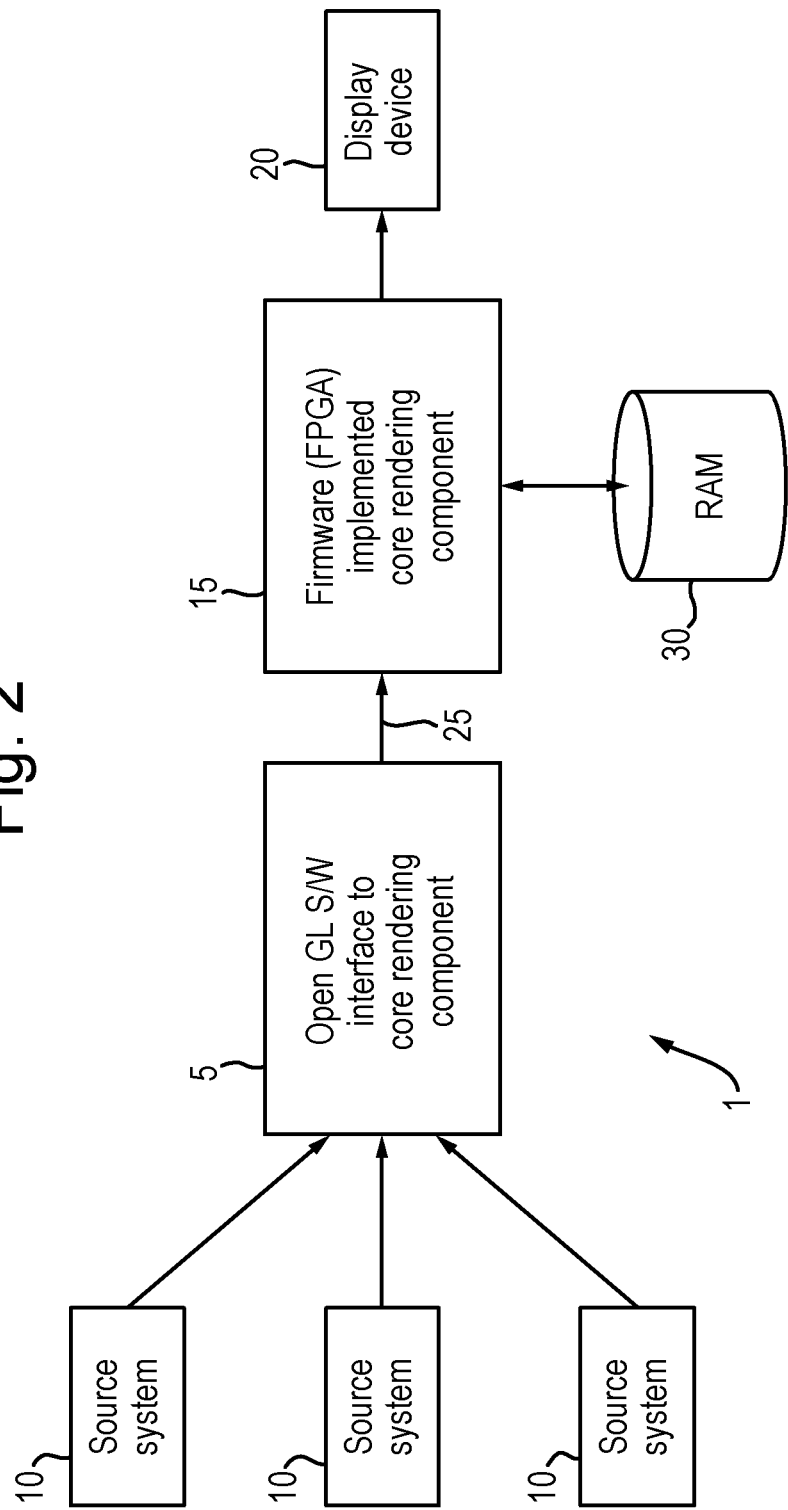
FIG. 2 shows in outline a functional block representation of an image generator according to an example embodiment of the present invention.

Referring to FIG. 2, an image generating apparatus 1 is shown comprising two main components: a software-implemented component executing on a digital processor 5, incorporating functionality to provide an interface to external systems 10 to receive (e.g. OpenGL) drawing commands defining symbols or other image artefacts and data to be displayed and to output corresponding image rendering commands; and a firmware-implemented component 15, comprising one or more field-programmable gate array (FPGA) devices or other types of programmable logic device configured to implement a selected range of image rendering operations corresponding to the range of image rendering commands that may be output by the processor 5. The firmware component 15 is configured as a range of image rendering modules responsive to received rendering commands to assemble an image as an array of pixels which, when output to a display device 20, enables artefacts defined by the received rendering commands to be displayed. The external systems 10 may for example include avionic systems executing an operational flight program arranged to output OpenGL commands or other standardised graphics language commands to define an image comprising data provided by aircraft sensors along with other predefined symbols.

Besides providing the interface to external systems 10, the processor 5 also provides an interface 25 to the firmware component 15. A predefined set of image rendering commands and other control commands is defined to control the functions of the firmware component 15. Functionality implemented in software executing on the processor 5 converts received drawing commands into commands selected from the predefined set and passes them over the interface 25. The firmware component 15 is configured to implement corresponding image rendering functions, for example those that would require a high processing bandwidth if implemented in software; specifically, image rendering functionality operating at a pixel level. The Processor 5 may implement lower bandwidth operations which, besides the interfacing functionality, include higher level drawing functionality relating to drawing primitives, e.g. lines and triangles, defined in received drawing commands. The Processor 5 may implement any defined transformations (e.g. translations, rotations, scaling) that are to be applied with knowledge of the vertices of a respective drawing primitive. However, certain of these transformations may also be implemented in the firmware component 15, for example the application of 3D rotations in vertex processing.

Besides converting drawing commands received from the external systems 10 into a series of rendering commands in the predefined set, the software-implemented functionality generates and interleaves other types of control command included in the predefined set, as required, including commands to control the general functioning of the firmware component 15 such as memory management commands, initialisation commands, and so on. A frame counter or other frame identifier may also be generated from the processor 5 and passed over the interface 25.

The image rendering commands define primitives to be drawn and the modes and effects to be applied, e.g. blending and texturing. The firmware component 15 implements an image rendering pipeline to render a defined image by manipulating the colour values of those pixels that will be involved in displaying the defined primitives. The firmware component 15 assembles data required to generate an image in frame buffers provided in external random access memory (RAM) 30.

The image generator 1 is arranged to operate on the principle that, for reasons of safety, a new image will be generated for each new frame period. Furthermore, in generating each new image frame, every pixel will be assumed to be of background colour, e.g. black, as specified by a rendering command received over the interface 25, unless otherwise defined or modified within the image rendering pipeline.

The functionality implemented by the Processor 5 and the firmware component 15 will now be described in more detail with reference to FIG. 3.

Figure 3:
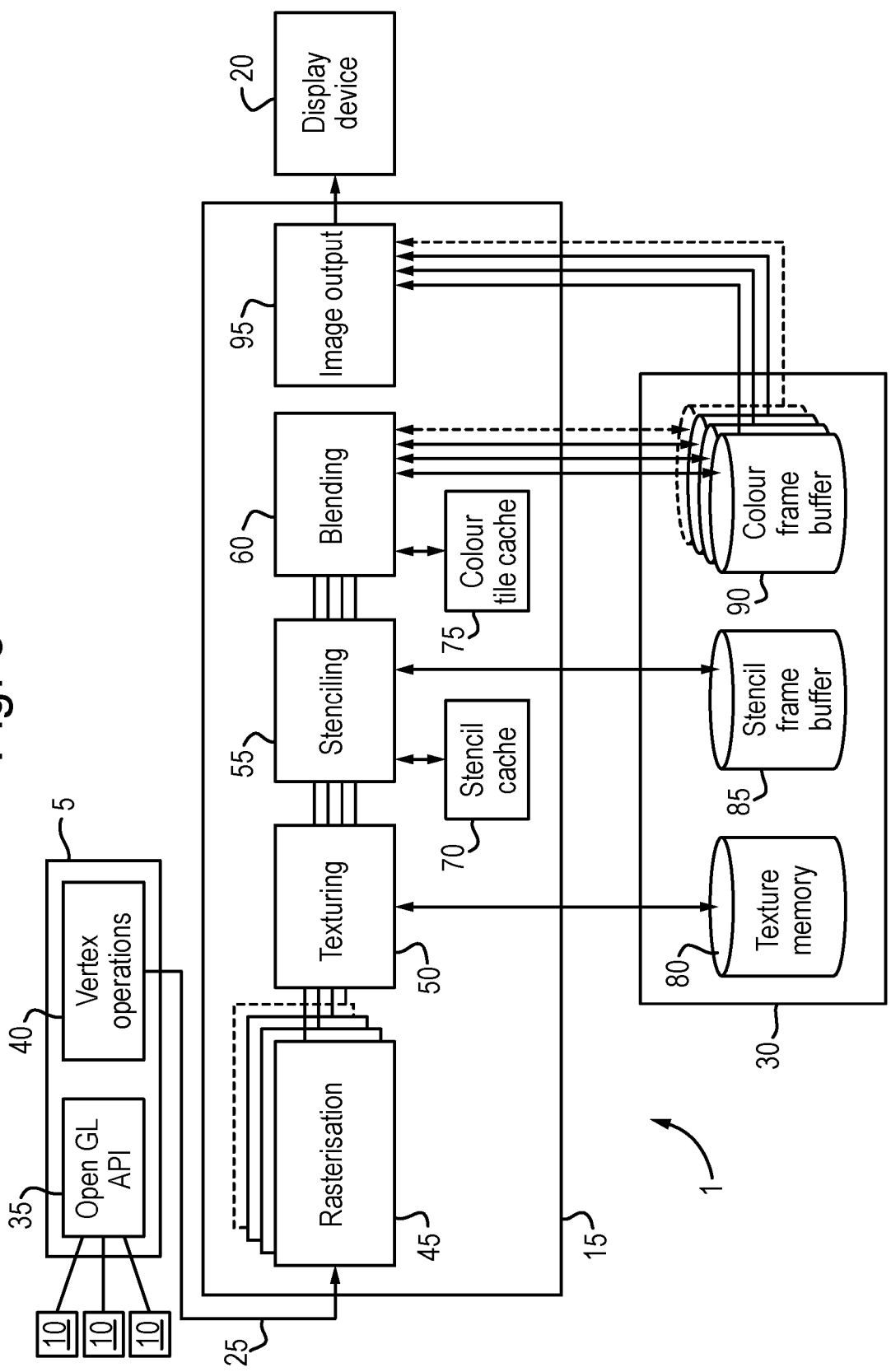
FIG. 3 shows in more detail a functional block representation of the image generator of FIG. 2, according to an example embodiment of the present invention.

Referring additionally to FIG. 3, a more detailed representation of the image generating apparatus 1 of FIG. 2 is shown. The processor 5 executes a software module 35 implementing an interface to the external systems 10, comprising an OpenGL application programmers' interface (API) for example. The OpenGL API 35 is arranged to support a selected subset of the OpenGL command set, appropriate to the drawing of images typical of the application to which the present invention is being directed. The processor 5 also executes a software module 40 dedicated to vertex-related operations. Such operations include identifying the vertices in drawing primitives, e.g. lines and triangles, defined in received OpenGL drawing commands and applying any defined rotation or scaling commands to reposition the vertices of the affected primitives. However, as mentioned above, these transformations may alternatively be applied in a module implemented in the firmware component 15. The module 40 generates rendering commands in the predefined set to specify the drawing primitives as they are defined and passes those rendering commands over the interface 25 to the firmware component 15. The rendering commands provide a geometric definition of each drawing primitive, interleaved with other rendering commands defining, for example, background colour, stencilling or blending modes to be applied. The module 40 may also generate and output a frame identifier for each image frame and output it to the interface 25, as required.

The firmware component 15 receives any commands generated by the Processor 5 over the interface 25 in a receiving module (not shown explicitly in FIG. 3) implemented in the firmware component 15 as part of the interface 25. The interfacing module passes details of each of the defined primitives to a Rasterisation module 45, or more than one Rasterisation module operating in parallel for greater throughput. The Rasterisation module 45 maps each defined primitive in the image to be generated to a pixel level rendition which it outputs as a stream of 'fragments' over a number of parallel pathways of the pipeline, each fragment containing the information needed to draw one pixel of a rasterised line, circle or polygon, for example. As the stream of fragments passes along the parallel pathways of the pipeline, pixel-level image rendering modules implemented within the firmware component 15 have the opportunity to modify the pixel data of each fragment as they arrive over one of the pathways In an example embodiment, the rendering modules include:

a Texturing module 50, used to apply textures to drawing primitives, in maps for example, or other filled graphics;

a Stenciling module 55, for applying defined regions of occlusion to an image; and a Blending module 60 for making appropriate pixel adjustments where lines or textured regions cross or overlap, for example.

A different combination of image rendering modules and effects may be implemented by the firmware component 15 in other example embodiments if required. Example variations include:

adding a module to implement the OpenGL depth buffer;

removing the Texturing module 50;

removing the Stenciling module 55;

adding a Scissoring module between the Texturing module 50 and the Stenciling module 55; and implementing certain functionality of the Vertex Operations module 40 in a module of the firmware component 15, in particular the function of applying any defined transformations to defined primitives, rather than in software executing on the processor 5 (as shown in FIG. 3).

The Texturing module 50 is provided with access as required to a Texture Memory 80 in the external RAM 30. The Stenciling module 55 is provided with its own Stencil Cache 70 within the firmware component 15 and with access to a Stencil Frame Buffer 85 in the external RAM 30 in which stencilling data may be assembled as rendering progresses. The Blending module 60 is also provided with its own Colour Tile Cache 75 and with access to one or more Colour Frame Buffers 90, typically two or three, in the external RAM 30 in which final colour image components may be assembled as rendering progresses. A technique for using these cache memories 70, 75 in such a way as to decrease image rendering time through a reduced need to access the Frame Buffers in external RAM 30 will be described below according to an example embodiment of the present invention.

When the various rendering operations are complete for a current frame period, an Image Output module 95 is triggered to assemble a complete pixel-level image definition from the contents of the Colour Frame Buffer 90. The assembled image data are then output for use directly or indirectly by the display device 20 to display the generated image. Provision of multiple Colour Frame Buffers 90 enables the Image Output module 95 to retrieve final image data, built up in one Colour Frame Buffer 90, while the rendering modules are generating the image for the next frame period using another Colour Frame Buffer 90. In this way, the image rendering pipeline is not unduly delayed by the final assembly and transfer of image data to the display device 20.

The inventors have carried out some detailed analysis, modelling the likely proportion of an image that needs to be updated from one frame period to the next in typical avionic display applications. This analysis has determined the likely requirement for read/write/modify operations upon pixels in an image area and the opportunities to make use of one or more cache memories internal to the firmware component 15 to reduce the need for accessing external memory. Inspired by this analysis, the inventors have selected a division of an image area, typically of 1280×1024 pixels, into so-called 'tiles'—non-overlapping blocks of pixels—on which to base the operation of the different rendering modules 50, 55 and 60. The tile size that appears to be best for cache management purposes is one of 64 pixels. The arrangement of those 64 pixels that appears to provide a satisfactory compromise between maximising the probability that more than one of the pixels to be modified in a rendering operation is within the same tile (as would be achieved with an 8×8 arrangement) and maximising the data transfer rate to and from external memory (as would be achieved with a 64×1 arrangement), is a 16×4 pixel arrangement. This gives a division of the image area in this example into 80×256 tiles. Furthermore, a satisfactory compromise in dimensioning the cache memory 70, 75 has been selected, based upon an analysis of the likely re-load rates from external RAM for different cache sizes versus the amount of internal memory capacity required in the FPGA to hold the cache cells. A compromise cache size of 32 cache cells has been selected, each cache cell able to store image data for one tile. The Stencil Cache 70 and Stencil Frame Buffer 85 may each store stencilling data comprising 8 bits per pixel (bpp) and the Colour Cache 75 and the Colour Frame Buffers 90 may each store colour image data comprising one of 8 bpp (monochrome), 16 bpp (e.g. RGB 565) or 32 bpp (RGBA colour).

To facilitate a fastest possible transfer of data between a cache and a respective frame buffer in the external RAM 30, image data for the pixels of a tile are stored, whether in the cache or in the frame buffer, in a linear sequence. That is, the image data for a tile are stored at consecutive memory locations or otherwise such that when the image data for pixels in any tile are written to or read from the external RAM 30 this may be effected as a 'burst' transfer of data—typically of 64 bytes for a tile of data between the Stencil Cache 70 and the Stencil Frame Buffer 85 and one of 64, 128 or 256 bytes between the Colour Tile Cache 75 and one of the Colour Frame Buffers 90. By selecting a double data rate (DDR) type of memory device for the external RAM 30, this burst data transfer facility may be exploited to greatest advantage. Moreover, the reduced requirement for accesses to the external RAM 30 enables a typical DDR memory device to be shared across some or all of the different rendering modules of the firmware component 15, reducing the overall number of devices required in a typical implementation. Other types of memory device may be used for the external RAM 30, for example a static random access memory (SRAM), e.g. a zero bus turnaround (ZBT) SRAM memory device. However, while an SRAM device may be easier to interface with from an FPGA device, it is generally of low storage capacity, typically only 2 to 8 MB, which may be less than the pre-allocated capacity required for the multiple Frame Buffers 85, 90 implemented in this first embodiment of the invention, in particular when double-buffering is required. However, a variation in the memory management functionality to enable the use of SRAM memory devices will be described later, below, in a further embodiment of the invention.

Besides defining an appropriate sub-division of the image area and dimensioning of cache memories 70, 75, the following technique has been devised for making use of the cache memories 70, 75 in making changes to pixel states by each of the Stenciling module 55 and the Blending module 60. It is intended that each of those rendering modules 55, 60 applies the same technique in using their respective cache memories 70, 75 and frame buffers 85, 90. This technique will now be described in detail with reference to FIG. 4.

Figure 4:
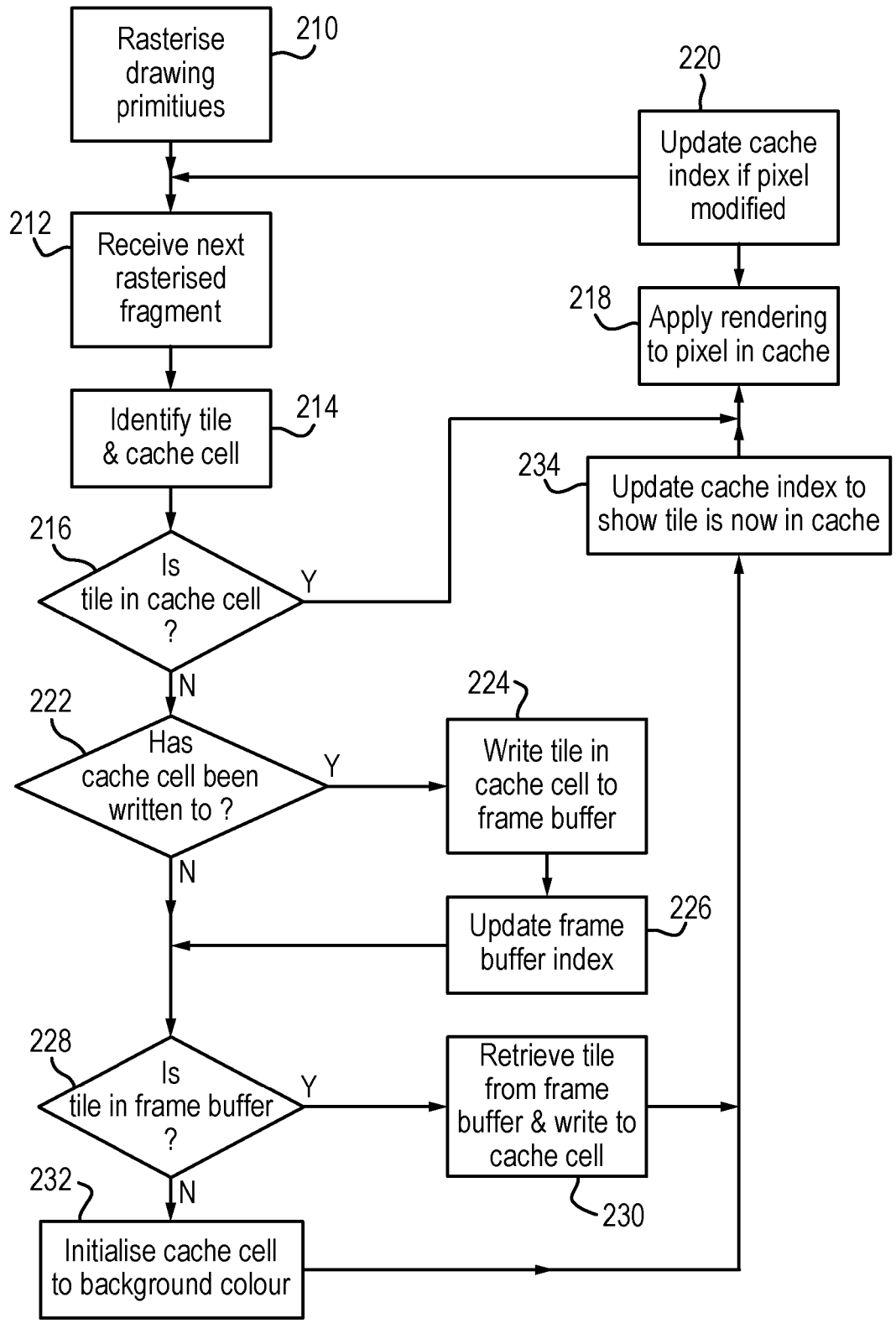
FIG. 4 is a flow chart showing steps in a process for rendering an image as may be used by an image rendering module in example embodiments of the present invention.

Referring additionally to FIG. 4, a flow chart is shown providing a conceptual sequential representation of the steps in what in practice is implemented as an image rendering process operating within a number of parallel pathways. The rendering modules of the firmware component 15 may act upon different fragments received along the different parallel pathways. However, the main purpose in presenting the process shown in FIG. 4 as a sequential process is to highlight a process adopted by each of the Stenciling module 55 and the Blending module 60 in modifying pixels using their respective cache memory 70, 75. The following principles are applied by each module 55, 60 in this process:

(1) Any change to a pixel colour value will be made by a rendering module within its cache memory having first ensured that the respective tile is contained in the cache memory;

(2) A direct-mapped caching technique is used such that each tile may be stored in only one predetermined cell in the cache, the Y and X coordinates of the tile within an image area addressing scheme determining the cache cell in which to look for or to store the tile data;

(3) Before making a first change to a pixel within a tile during any frame period, the respective cache cell is initialised such that all pixels within the tile are set to be displayed with the background pixel colour;

(4) A tile will only be written to a respective frame buffer in the external RAM 30 if at least one pixel within the tile has been modified by a rendering module during the frame period to have, or to enable display with a non-background colour.

Applying these principles, the process shown in FIG. 4 includes a Step 210, an ongoing rasterisation step in which a stream of fragments is generated from the Rasterisation module(s) 45 in response to received rendering commands. Each fragment comprises the x and y coordinates of the respective pixel, the pixel colour, an identifier for the drawing primitive (allocated for example by the receiving module for the interface 25 to assist with synchronisation) of which the pixel is a part, and other information, for example depth information that may be used by rendering modules to define the pixel. The pixel colour may range in a scale of definition from a monochrome greyscale value in monochrome display applications through to a Red, Green, Blue and Alpha combination, the Alpha value being used to indicate a degree of transparency/blending to be applied to the pixel. The intention is that, as these fragments are passed along the image rendering pipeline, the way they are to be displayed may be modified by one or more of the image rendering modules, or not, as required. In parallel with this, any interleaved rendering commands received over the interface 25 for controlling currently selected stencilling; blending or scissoring modes for example, are passed directly to the respective rendering modules. Each module may then do what it is required to do according to the currently selected mode for the primitive for which the fragments have been rasterised, applying that mode when each respective fragment arrives over the pipeline.

At Step 212, a fragment output by the Rasterisation module(s) 45 is received by an image rendering module (55, 60) and, at Step 214, from the supplied (x,y) coordinate of the pixel, the coordinates of the respective image tile, say 'T1', are determined together with the direct-mapped cache cell, say 'C1', in which the tile 'T1' may be stored.

To enable a rapid determination of whether a tile is currently stored in the determined cache cell or the respective Frame Buffer and of the current state of a tile, two types of index are maintained by the rendering modules of the firmware component 15: a Cache Index associated with each Cache 70, 75 within the firmware component 15; and a Buffer Index associated with each Frame Buffer 85, 90 and stored in the external RAM 30. The Cache Indices are maintained respectively by the Stenciling module 55 and the Blending module 60 comprising a table for each of the possible 32 cells with the cache. The table for each cache cell includes the following information:

a flag to indicate whether the cell is in use (this flag may be cleared for a particular cache at the beginning of each new frame period by a command received over the interface 25, from the software component module 40 for example);

a flag to indicate, if the cell is in use, whether the tile within the cell has been modified since being loaded from the respective Frame Buffer 85, 90 or initialised;

the start address of the area allocated for storage of the tile in the respective Frame Buffer 85, 90. The address recorded indicates the tile start address relative to the first address of the Frame Buffer in the external RAM 30. This relative start address also uniquely identifies the tile being held in the cache cell.

The Buffer Index is updated by a rendering module in the event that a tile is written to the respective Frame Buffer. The Buffer Index comprises a single bit flag for each possible tile in the Frame Buffer, the flag being set to a '1' if the tile has been written to and to a '0' if all the pixels in the tile are to be displayed with the currently defined background colour. As mentioned above, a tile will only ever be written to the Frame Buffer, and a respective flag in the Buffer Index is set to a '1', if at least one pixel within the tile is to be or may be displayed with a non-background colour.

At the beginning of each frame period, the Cache Indices, and those Buffer Indices associated with the Frame Buffers to be used as the Stencil Frame Buffer 85 and the Colour Frame Buffer 90 during the frame period, are initialised by a command received over the interface 25. That is, the tables in the Cache Indices are set to nulls and all flags in the Buffer Indices are set to '0'. It is not necessary to initialise the contents of the Frame Buffers themselves as the respective buffer contents are overwritten by each new tile writing operation; the respective Buffer Index indicating whether there is anything new to be read from the Frame Buffer. The contents of the Cache cells will only be initialised as required during rendering.

If a tile is currently held in a cache cell, this combination of a Cache Index and a Buffer Index may be used to indicate one of three possible states for the tile:

1) all pixels in the tile are set to be displayed with the current background colour;

2) one or more pixels within the tile are currently set to, or may be displayed with a non-background colour, but none of those pixels has been modified since the tile was loaded into the cache cell from the respective Frame Buffer;

3) one or more pixels within the tile have been modified since the tile was initialised or loaded from the respective Frame Buffer.

Therefore, at Step 216 of the process in FIG. 4, the respective Cache Index is accessed to determine whether the tile T1 is currently stored in the cache cell C1, identifiable by the start address stored in the table in the cache cell index. If it is, then at Step 218 the image rendering module reads the currently stored image data for the pixel from the cache cell C1, modifies it if required and writes the image data back into the cache cell C1. If the image data for the pixel were modified to define or allow for a non-background colour, the Cache Index is updated at Step 220 (if not already indicating such a state), and the process then returns to Step 212 to receive the next fragment arriving over the pipeline. In practice, the next fragment arrives over a respective pathway in the pipeline unless the pipeline has been stalled while a rendering operation on another fragment in another parallel pathway completes.

If, at Step 216, the tile T1 is not currently stored in the cache cell C1 then there are two possibilities: either another tile, say tile T2, is currently stored in the cache cell C1 according to the start address stored in the cache cell table in the cache index; or no tile is currently stored in the cache cell C1. Thus, at Step 222, if the Cache Index indicates that a tile T2 is currently stored in cache cell C1 and the Cache Index shows that the cache data for tile T2 are written to during this frame period, then at Step 224 the tile T2 is written to the respective Frame Buffer 85, 90 as a burst transfer of data. The associated Buffer Index is updated to indicate that the tile T2 is now stored in the Frame Buffer and the process proceeds to Step 228.

At Step 228, with the cache cell now vacant, the Buffer Index is accessed to determine whether the tile T1 is currently stored in the Frame Buffer, as would be indicated by a '1' in the respective flag for the tile in the Buffer Index. If the tile T1 is stored in the Frame Buffer, then the process advances to Step 230 at which the tile T1 is read from the Frame Buffer as a burst transfer of data and written to the cache cell C1. At Step 234 the Cache Index is updated, in this case to indicate that the tile T1 is now in the cache cell but has not yet been modified since being loaded from the Frame Buffer. The process then proceeds to Step 218 for the rendering module to perform any required read/modify/write operation on the image data for the pixel now stored in the cache.

If, at Step 228, the Buffer Index shows that the tile T1 is not currently stored in the Frame Buffer, then all pixels in the tile are currently assumed to be of background colour and, at Step 232, the contents of cache cell C1 are initialised to the background state. The process then resumes at Step 234 where, in this case, the cache index is updated to show that the initialised tile T1 is in the cache cell C1, but that all pixels are currently to be displayed with the background colour and the tile T1 has not yet been modified. The rendering module is then able to carry out any required modification to the pixel data, at Step 218, now that the tile T1 is in the cache.

When the rendering process shown in FIG. 4 has been completed by the rendering module for all the fragments received over the pipeline during a current frame period, there may be one or more tiles still held in the cache. The Cache Index is accessed to identify any of those tiles that have been modified while in the cache to have at least one pixel of, or enabled for display with a non-background colour. Those that have are written to the respective Frame Buffer. The Frame Buffer then holds the image data for only those tiles that include at least one pixel that is to be, or may be, displayed with a non-background colour and the associated Buffer Index identifies which tiles have that property. All other tiles are assumed to comprise pixels of the current background colour, as indicated by a '0' value assigned to each respective flag in the Buffer Index.

When each of the image rendering modules 50, 55, 60 has acted upon all the fragments received over the pipeline from the Rasterisation module(s) 45 and rendering is complete for a current frame period, the Image Output module 95 is triggered to begin to assemble the image data to be output to the Display Device 20. The Image Output module 95 uses the Buffer Index associated with a respective one of the Colour Frame Buffers 90, as mentioned above, to determine whether any tile data are to be read from the Colour Frame Buffer 90 or whether the respective pixels are to be set to the background colour.

It was indicated above that a different memory management technique may be implemented to enable the use of SRAM devices as the RAM 30 in place of DDR-type memory devices for frame buffering purposes. Whereas SRAM devices typically have a lower storage capacity than DDR devices, an SRAM is easier to interface to an FPGA and is therefore potentially easier to certify to avionic standards than a DDR memory implementation. However, a further innovation is required to enable the functional equivalent of the Stencil Frame Buffer 85 and the Colour Frame Buffers 90, in particular, to be implemented and managed using much smaller memory devices. Such an innovative implementation will now be described in a further embodiment of the invention.

In a first variation over the previously described embodiment, memory is reserved in the RAM 30 for a fixed number of tiles only, providing a pool of tile storage that may be used for frame buffering purposes by the Stenciling module 55 and the Blending module 60.

In the previous embodiment, each Frame Buffer 85, 90 included reserved space for all the possible tiles in the image area; in the example above for 80×256 tiles. However, in this further embodiment, space in the RAM 30 is reserved for a much smaller number of tiles, typically only 5% to 20% of the tiles in the image area, the number required depending upon the symbol content for the particular application. If double buffering is to be used, for example to satisfy the requirements of Colour Frame Buffers 90, then memory for two or more pools of tiles may be reserved, the amount of space for each pool being determined by the tile size (e.g. 64, 128 or 256 bytes) and the number of tiles in the pool.

As in the previous embodiment, the tiles are stored in the reserved tile pool in linear byte order so that a stored tile may be stored and retrieved using a sequence of addresses and the address of any particular tile relative to the start address of the pool may be determined by multiplication of a unique pool tile reference number, allocated sequentially for the tiles in the pool, by the tile size.

Having defined one or more pools of tile storage in the RAM 30, available for use by the Stenciling module 55 and by the Blending module 60 in place of pre-allocated storage for the Frame Buffers 85, 90 respectively, a corresponding variation is required to the composition of the Cache Index maintained by each of the Stenciling module 55 and the Blending module 60.

In the previous embodiment, each Cache Index stored a start address for the respective tile in the area of RAM 30 reserved for the respective Frame Buffer 85, 90. However, in this variant, the tile number that references the tile in the image area is stored in the Cache Index in place of the address allocated for the tile in the RAM 30. When a tile currently held in the cache 70, 75 has been written to by the respective Stenciling module 55 or Blending module 60 and is to be stored in a respective Frame Buffer 85, 90, the Stenciling or Blending module 55, 60 determines the reference of the next available tile in the pool of tile storage and calculates the address for storing the tile in the pre-allocated pool of tile storage based upon the determined tile reference. The cached tile is then written out to the RAM 30 beginning at the calculated address as a linear sequence of bytes.

The content of the Buffer Indices associated with the Frame Buffers 85, 90 are also modified. In the previous embodiment, a 1-bit Boolean flag was stored for every possible tile in the image area to indicate whether or not the tile had been written to and hence whether it was stored in the respective Frame Buffer 85, 90. In this variant, the pool tile reference allocated when the cached tile was written to RAM 30 is stored in addition to or in place of the Boolean flag in the respective Buffer Index record. If the Boolean flag is retained, then the flag is used as previously to indicate whether the tile has been written to by the Stenciling or Blending module 55, 60 and the stored pool tile reference enables the address in the tile pool storage to be determined. During initialisation for each new frame period, only the Boolean Flags need to be initialised in the Buffer Indices as the pool tile reference will be over-written in the event that a tile is modified and stored in the RAM 30.

If the pool tile reference replaces the Boolean flag, then the presence of a pool tile reference indicates that the tile has been written to by the Stenciling or Blending module 55, 60 and enables the address in the tile pool storage to be determined. If the tile has not been written to while in the Cache 70, 75, then the Buffer Index entry remains blank, as initialised for this implementation variant for each new frame period. In either case, the Buffer Index associated with the respective module 55, 60 provides a cross reference between a tile in the image area, one of 80×256 tiles, and, if written to, the allocated pool tile reference, used to define the start address in the pool of tile storage where the tile data are stored, the Buffer Index acting as an indirection index to the stored tile data. In this way, tile storage space in the RAM 30 is only used to store those tiles that contain pixels to be changed from the default background colour. In the previous embodiment, Frame Buffer (85, 90) storage space was reserved for all the tiles in the image area, e.g. 80×256 tiles, whether or not they had been written to during rendering.

Referring again to FIG. 4, the process described above with reference to FIG. 4 is modified slightly for this variant so that, at Step 224, when it is decided to write a modified tile from the cache cell to the RAM 30, the next available tile from the pool of tile storage is determined and, from the reference number of the allocated pool tile, the address of the tile in the pool is calculated. The tile is then written to the RAM 30 beginning at the calculated address. At Step 226, the Frame Buffer is updated by writing the allocated pool tile reference into the index entry for the corresponding tile in the image area and setting the Boolean flag, if present.

When assembling the final image for output, the Image Output module 95 accesses the Buffer Index for the Colour Frame Buffer 90, in particular, reads the Boolean flag for each tile in the image area and, if present and set, reads the associated pool tile reference and calculates the address in the pool tile storage from where the respective tile data may be retrieved. If the Boolean flag is not included in the Buffer Index, then the presence of a pool tile reference in the Buffer Index for a tile indicates that the tile has been modified during rendering and, using that reference, the Image Output module 95 determines the address of the stored tile data and retrieves it.

Where embodiments of the present invention are to be applied to systems displaying safety-critical information, relevant standards may apply to the performance of such systems. Demonstrable compliance with such standards may be a prerequisite for use of the system in such applications. In the case of avionic displays, particularly those displaying primary flight data likely to be relied upon by a pilot, the applicable standards, published by the Radio Technical Commission for Aeronautics (RTCA) Incorporated, are DO-254, as applied to complex electronic hardware (such as FPGAs or application-specific integrated circuits ASICs) and DO-178B/C, as applied to software. Both standards have 5 levels of Design Assurance Level (DAL) from DAL A (the highest) down to DAL E. DAL A is typically applied to a primary flight instrument, whereas DAL C may be applied to a secondary instrument; the applicable DAL level depending upon the effect on the aircraft operation of a failure. Both DO-254 and DO-178 are based upon independent test and review of the firmware/software when operating in its representative environment. DAL A requires 100% modified condition/decision coverage (MC/DC). For DAL C, testing is required to achieve 100% requirements coverage. In the case of an implementation using firmware such as in an FPGA, these conditions all need to be tested in-situ from the pins of the device; for software the compiled object code must be tested.

In a typical implementation of the image rendering components of the present invention in a firmware component 15 such as an FPGA, the functional design is defined using approximately 30,000 lines of code in a hardware description language such as VHDL. To certify the full functional design of such a device to the DAL A standard would be a very costly exercise. However, the inventors have devised a technique to enable the image generation system of the present invention to be assured to DAL A overall without necessarily imposing a need for DAL A certification of the design of the FPGA component 15 taken in isolation. The applicable level of assurance required for the FPGA component depends upon the safety risk it poses, in particular the probability of it generating "Hazardously Misleading Information (HMI)" and of that information remaining visible on the associated display for longer than a defined short time period, e.g. 0.5 s.

As mentioned above, the image rendering component 15 necessarily implements functionality other than drawing functions. These other functions are also defined in the approximately 30,000 lines of VHDL code. Recognising this, and taking advantage of the fact that the chosen FPGA implementation has enabled the inventors to have full control over the mathematical details of the rendering algorithms implemented by the various rendering modules, the inventors have been able to implement an entirely independent software-implemented simulation of only the image rendering functionality of the firmware component 15. This rendering simulator is arranged to receive the same rendering commands as received by the firmware component 15 over the interface 25 or to receive drawing commands from a point further back in the system, for example from the OpenGL API 35 or from the external Source Systems 10 directly, according to the safety case applicable. The rendering simulator generates from the received drawing or rendering commands a set of image data as would be output by the Image Output module 95 to control the Display Device 20, to bit-accuracy. The software-implemented Rendering Simulator—providing a key component of an independent Integrity Monitor—implements only the image rendering functions of the firmware component 15, not the entire range of functionality necessarily represented in the 30,000 lines of VHDL. The result is an entirely or substantially software-implemented Integrity Monitor able to validate the image rendering functionality of the firmware-implemented component 15 using only about 3000 lines of code in a programming language such as 'C'.

In a further example implementation, the functionality of the OpenGL API 35 and the drawing functions of the Vertex Operations module 40 may be replicated as modules within the Integrity Monitor 100 such that all the drawing functions of the image generator, according to example embodiments of the present invention described above, may be validated.

Attainment of the DAL A level of assurance in such a system requires only that the Integrity Monitor be certified to DAL A while the firmware component 15 and the functionality implemented on the processor 5 may need only to be certified to the lesser DAL C. Furthermore, any complexity in the implementation of the Integrity Monitor is much reduced by the design choice in example embodiments of the present invention to implement only a necessary subset of the OpenGL drawings commands, essential to the rendering of image artefacts to be displayed in avionic HUDs or HMDs. This is an example of an application in which efforts both to reduce image-rendering latency and to enable design assurance to the required level has both incurred a potential burden—the potential need to certify a complex firmware component to DAL A—but at the same time provided an opportunity to reduce that burden by enabling a relatively simple software-implemented Integrity Monitor to be developed along-side which can more easily be assured to the higher level.

Functionality of the Integrity Monitor according to further example embodiments of the present invention will now be described in more detail with reference to FIG. 5 and to FIG. 6.

Figure 5:
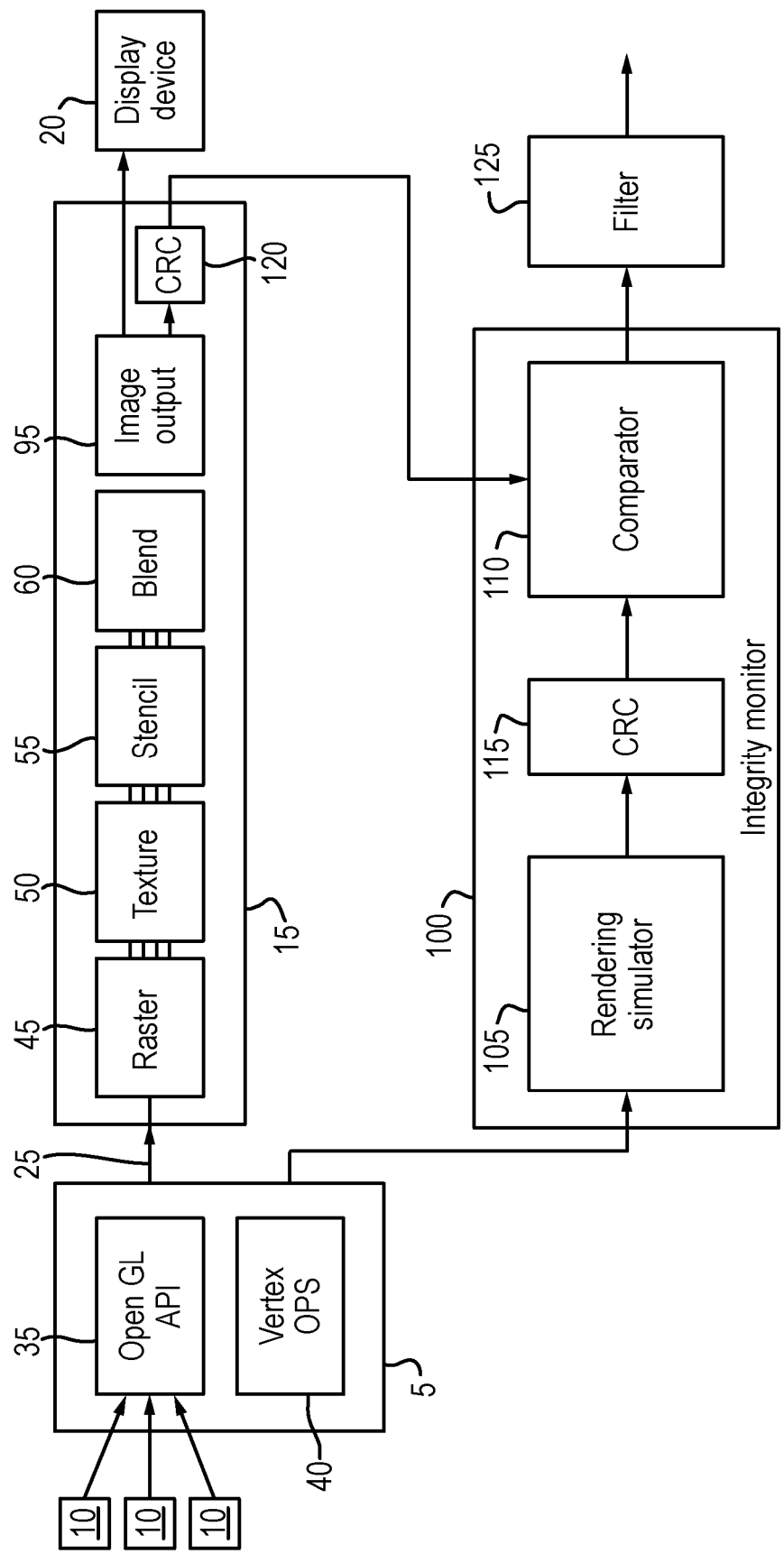
FIG. 5 shows a functional block representation of the image generator of FIG. 3 further comprising functional elements of an Integrity Monitor as may be included in the image generator according to example embodiments of the present invention.

Referring firstly to FIG. 5, a functional block diagram is provided showing the interfacing component 5, the firmware image rendering component 15 and an associated Integrity Monitor component 100 comprising two main sub-components—a software-implemented Rendering Simulator 105 and a Comparator module 110. As discussed above, the Integrity Monitor 100 is arranged to take, specifically, the rendering commands output by the interfacing component 5 in respect of a selected frame period and to generate what is intended to be a bit-accurate set of image data as would be output to the Display Device 20 by the firmware component 15 for that frame period. The Comparator module 110 is arranged to compare the image data output by the firmware component 15 with the image data generated by the Rendering Simulator 105 and to output a signal indicating a match or a discrepancy.

Being software-implemented, the Rendering Simulator 105 is likely to require a longer period of time to render an image as compared with the typical 4 ms of the firmware component 15. However as a design constraint, the Integrity Monitor 100 is required to detect a fault in the image rendering functionality of the firmware component 15 within whatever time period is specified by the applicable standard. For example the standard may require that a fault in the generation of images displaying primary flight information is to be detected within 0.5 s of those flight data (intended for display) becoming available from the avionic systems of the aircraft, or it may require that an erroneous feature in an image (HMI) may persist on the display for no longer than 0.5 s before it is corrected or removed. To meet this standard, it is not necessary to check the image data generated by the firmware component 15 for every frame period, so long as what is visible on the display does not persist, if faultily generated, beyond the required time period. It would therefore be acceptable, for example, for the Integrity Monitor 100 to check one image frame every 100 ms, for example, corresponding to one image frame in every 5 or 6 images generated by the firmware component 15, assuming a frame rate of 50 or 60 Hz respectively. This would leave sufficient time to act upon the result, for example providing a warning signal to the pilot user that certain information cannot be displayed at that time.

The Integrity Monitor 100 is arranged to record an identifier, e.g. a frame number, for each frame period for which the Rendering Simulator 105 is to generate a corresponding image and the Comparator module 110 is arranged to record a corresponding identifier for each frame of image data output by the firmware component 15. The Comparator module 110 is then able to ensure that the image frames for the correct frame periods are selected and compared from all those output by the firmware component 15.

To enable the Comparator module 110 to perform a rapid comparison of two sets of image data, as an alternative to carrying out a bit-by-bit comparison of the two sets of image data, the Integrity Monitor 100 includes a cyclic redundancy check (CRC) calculator 115 to calculate one or more CRC values or other type of digital signature for the image data generated by the Rendering Simulator 105. An additional module of functionality may be included in the firmware component 15, for example in an output path from the Image Output module 95, to carry out the same CRC or digital signature calculation on each frame of image data output by the firmware component 15 and to output the calculated results to the Comparator module 110. Alternatively, the Comparator module may itself be arranged to calculate the CRC or digital signature on each frame of image data received from the firmware component 15 and/or the Rendering Simulator 105. In either case, the Comparator module 110 receives the frame identifier and the respectively calculated CRC values or digital signatures for image data generated by each of the Rendering Simulator 105 and the firmware component 15 and performs the comparison for the appropriate frames by comparing only the CRC values or digital signatures.

The output of the Comparator module 110 may be passed through a Filter 125 to block transitory 'nuisance' failures which would not generally have an impact on the safety of displayed information. The Filter 125 may be implemented as a module of the Integrity Monitor 100 or separately as shown in FIG. 5, for example in an input stage of a wider display system of which the image generator of the present invention is a part. The output of the Filter 125, if still indicating a discrepancy, is logged as a fault and the display may be blanked automatically to prevent display of the erroneous information.

The Comparator module 110 may be implemented as a separate module of the overall Integrity Monitor functional block shown in FIG. 5, either in a software implemented component executing on the same digital processor as the Rendering Simulator 105 or on a separate digital processor, or as a firmware component implemented using an FPGA, for example. However, whatever the implementation choice, it is likely that both elements will need to be included in any DAL A assessment.

It is intended in this implementation of the Integrity Monitor functionality that the entire set of image data for a selected frame period is compared and validated. However, it may be envisaged that in some applications a check of only selected elements of an image would be acceptable, according to the applicable safety case and availability of an appropriate set of image data for those elements during an image rendering process. This may allow a greater number of image frames to be checked. The elements selected for validation may also be changed over time to give wider scope to the validation checks without increasing the overall processing requirements or reducing the rate of checking image frames below a critical rate.

A variation on the implementation of the Integrity Monitor 100 referred to above will now be described in more detail with reference to FIG. 6.

Referring to FIG. 6, an Integrity Monitor 130 is provided with increased functionality, including all the functionality of the Integrity Monitor 100 described above with reference to FIG. 5, but with the addition of a module 135 implementing replicated functionality of the OpenGL API 35. Furthermore, a Rendering Simulator 140 implements drawing functionality of the Vertex Operations module 40 in addition to having the functionality of the Rendering Simulator 100 of FIG. 5 simulating the rendering functionality implemented by the firmware component 15.

The bases for image comparison by a Comparator module 110 and the use of a Filter 125 remain as for the FIG. 5 embodiment.

While the present invention has been described and illustrated with reference to particular embodiments, it will be appreciated by those of ordinary skill in the art that the invention lends itself to many different variations not specifically illustrated herein. By way of example only, certain possible variations will now be described.

Embodiments of the present invention may make use of multiple similar caches/frame buffer arrangements in series or in parallel, ordered according to the image rendering requirements. Different designs may utilise different tile sizes, different tile aspect ratios, different numbers of cache cells, etc. The variations in the design may be made to tune a system for different primary drawing patterns, different levels of complexity in displayed images, different image refresh rates and proportions of the image being updated, etc.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method for generating digital image data for displaying an image according to received drawing commands, the method comprising:
(i) defining the image as an array of tiles, each tile comprising digital image data defining a predetermined plurality of pixels of the image;
(ii) in a cache memory, configured to store digital image data for one or more tiles, initialising the digital image data for a tile in the cache memory by setting each of the plurality of pixels in the tile to have a background colour;
(iii) modifying one or more pixels of the tile when stored in the cache memory according to at least one of said received drawings commands;
(iv) if the modifying at (iii) results in at least one pixel of the tile having a non-background colour, storing the tile of digital image data in a frame buffer memory; and
(v) repeating (ii) to (iv) until said received drawing commands have been applied to modify pixels in respective tiles of the image, the frame buffer memory storing those tiles of digital image data in which at least one pixel has been modified by a said received drawing command to have a non-background colour.

2. The method according to claim 1, comprising:
(vi) assembling, for output, digital image data for display of the image by assembling those tiles of digital image data stored in the frame buffer memory and defining the pixels in digital image data for all other tiles of the image as pixels having the background colour.

3. The method according to claim 2, wherein, if the modifying at (iii) relates to a pixel of a tile stored in the frame buffer memory, (iii) comprises reading the respective tile of digital image data from the frame buffer memory, storing the tile of digital image data in the cache memory and modifying one or more pixels of the tile when stored in the cache memory.

4. The method according to claim 2, wherein (iv) comprises storing the tile of digital image data in the frame buffer memory if storage space in the cache memory is required to store another tile or if all said received drawing commands have been applied to modify pixels for the image.

5. The method according to claim 2, wherein generating an image according to said received drawing commands comprises, at (iii), identifying from said received drawing commands one or more different image rendering functions and applying the one or more different image rendering functions to modify one or more pixels of the tile when stored in the cache memory.

6. The method according to claim 5, wherein, at (iii), each of the one or more different image rendering functions is arranged to store and to modify pixels of tiles in a different respective cache memory.

7. The method according to claim 5, wherein, at (iv), each of the one or more different image rendering functions is arranged to store modified tiles in a different respective frame buffer memory.

8. The method according to claim 5, the method further comprising:
(vii) simulating, using a digital processor executing a computer program, the at least one image rendering function and simulating the assembling for output, at (vi), of digital image data for display of the image;
(viii) applying the simulating from (vii) to generate simulated digital image data according to said received drawing commands; and
(ix) comparing the digital image data assembled at (vi) with the simulated digital image data generated at (viii) to determine the accuracy of image data generated by the image generator.

9. The method according to claim 8, wherein:
(vii) comprises simulating the at least one image rendering function of the image rendering component and simulating the assembling of digital image data at (vi) to generate, at the simulated digital image data to a data bit-level of accuracy; and
(ix) comprises performing a bit-level comparison of the digital image data assembled at (vi) with the simulated digital image data generated at (viii) and to indicate a potential fault with the image generator if the comparison identifies a bit-level discrepancy in the compared data.

10. The method according to claim 9, wherein (ix) comprises calculating cyclic redundancy check (CRC) values or digital signatures for each of the digital image data assembled at (vi) and the simulated digital image data generated at (viii) and comparing the calculated CRC values or digital signatures.

11. The method according to claim 2, wherein the cache memory is a direct-mapped cache memory comprising a plurality of cache cells, each cache cell being designated for storage of a tile of a different predetermined plurality of tiles of the image.

12. The method according to claim 11, wherein (iii) comprises maintaining a cache index associated with the cache memory by storing in the cache index, for a respective cache cell:
an identifier for a tile stored in the cache cell; and
an indication of whether or not at least one pixel of the tile has been modified while stored in the cache cell.

13. The method according to claim 12, wherein the identifier for a tile comprises a start address allocated for the tile in the frame buffer memory and (iv) comprises, if the modifying at (iii) results in at least one pixel of the tile having a non-background colour, storing the tile of digital image data in the frame buffer memory in consecutive memory locations beginning at the allocated start address indicated by the identifier for the tile.

14. The method according to claim 12, wherein the identifier for a tile comprises a unique tile number for the tile and (iv) comprises maintaining an indirection index to the frame buffer memory, when storing a tile in the frame buffer memory, by determining a start address of an available storage space for the tile in a pool of storage space allocated for the frame buffer memory and updating a record in the indirection index recording, for the unique tile identifier of the tile, the determined start address, and storing the tile in consecutive memory locations beginning at the determined start address.

15. The method according to claim 2, wherein (iv) comprises maintaining a frame buffer index, the frame buffer index comprising, for every tile of the image, an indicator of whether or not the tile includes at least one pixel of a non-background colour, and (iv) comprises, when storing a tile in the frame buffer memory, setting the respective indicator for the tile in the frame buffer index to indicate that the tile comprises at least one pixel of a non-background colour.

16. The method according to claim 15, wherein (i) comprises initialising the indicators in the frame buffer index to indicate that, for every tile of the image, all pixels are of the background colour and (vi) comprises accessing the frame buffer index to determine which tiles to read from the frame buffer memory and which tiles to set to the background colour.

17. The method according to claim 1, wherein said received drawing commands relate to one image frame in a sequence of image frames.

18. The method according to claim 1, wherein (i) comprises defining the image as an array of tiles, each tile comprising 64 pixels in a rectangular arrangement of 16 pixels by 4 pixels.

19. An image generator for generating digital image data for displaying an image according to received drawing commands, the image being defined by an array of tiles, each tile comprising digital image data defining a predetermined plurality of pixels of the image, the image generator comprising:
at least one image rendering component configured to generate the digital image data according to said received drawing commands, the at least one image rendering component comprising a cache memory configured to store digital image data for one or more tiles;
a frame buffer memory accessible to the at least one image rendering component; and
an output component configured to assemble, for output, digital image data generated for the image;
wherein the at least one image rendering component is configured:
to store in the cache memory digital image data for one or more tiles;
to initialise the digital image data for a tile stored in the cache memory by setting each of the plurality of pixels in the tile to have a background colour;
to modify one or more pixels of a tile when stored in the cache memory according to at least one of said received drawings commands; and
if the modifying results in at least one pixel of a tile having a non-background colour, to store the tile of digital image data in the frame buffer memory.

20. The image generator according to claim 19, wherein the output component is configured to assemble, for output, digital image data for the image by assembling tiles of digital image data stored in the frame buffer memory and defining the pixels in digital image data for all other tiles of the image as pixels having the background colour.

21. The image generator according to claim 20, wherein the at least one image rendering component is configured, if the modifying relates to a pixel of a tile stored in the frame buffer memory, to read the respective tile of digital image data from the frame buffer memory, to store the tile of digital image data in the cache memory and to modify one or more pixels of the tile when stored in the cache memory.

22. The image generator according to claim 20, comprising a plurality of said image rendering components, each said image rendering component having a respective cache memory and each being configured to implement a different image rendering function to modify pixels of a tile stored in the cache memory according to said received drawing commands.

23. The image generator according to claim 22, comprising a plurality of frame buffer memories, wherein each said image rendering component is arranged with access to a different one of the plurality of frame buffer memories.

24. The image generator according to claim 22, comprising an interfacing component for receiving said drawing commands and for generating therefrom respective image rendering commands in a predefined image rendering command set for output to the plurality of said image rendering components to apply respective said image rendering functions to generate the digital image data according to the generated image rendering commands.

25. The image generator according to claim 20, wherein the at least one image rendering component comprises:
an arrangement of one or more configurable firmware devices configured to implement at least one image rendering function and to generate the digital image data according to said received drawing commands; and
an integrity monitor, comprising
a digital processor and a computer program which, when executed by the digital processor, causes the digital processor
to simulate the at least one image rendering function by the one or more configurable firmware devices of the at least one image rendering component,
to simulate the assembly of digital image data, for output, by the output component, and
to generate, using the simulated at least one image rendering function and simulated assembly of digital image data, simulated digital image data defining pixels in an image to be displayed according to said received drawing commands; and a comparator, configured to compare the digital image data assembled by the output component and the simulated digital image data generated by the integrity monitor to determine the operating integrity of the image generator.

26. The image generator according to claim 25, wherein the integrity monitor is arranged to simulate the at least one image rendering function of the at least one image rendering component and the assembly of digital image data and to generate the simulated digital image data to a data bit-level of accuracy and the comparator is configured to perform a bit-level comparison of the digital image data assembled by the output component with the simulated digital image data generated by the integrity monitor and to indicate a potential fault with the image generator if the comparison identifies a bit-level discrepancy in the compared data.

27. The image generator according to claim 26, wherein the comparator is configured to calculate cyclic redundancy check (CRC) values or digital signatures for each of the digital image data assembled by the output component and the simulated digital image data and to compare the calculated CRC values or digital signatures.

28. The image generator according to claim 19, wherein the cache memory is a direct-mapped cache memory comprising a plurality of cache cells, each cache cell being designated for storage of a tile of a different predetermined plurality of tiles of the image.

29. The image generator according to claim 28, comprising a cache index store configured to store, for each cache cell:

an identifier for a tile stored in the cache cell; and
an indication of whether or not at least one pixel of the tile has been modified while stored in the cache cell.

30. The image generator according to claim 29, wherein the identifier for a tile comprises a start address allocated for the tile in the frame buffer memory and if the modifying results in at least one pixel of the tile having a non-background colour, the image rendering component is configured to store the tile of digital image data in the frame buffer memory in consecutive memory locations beginning at the allocated start address indicated by the identifier for the tile.

31. The image generator according to claim 29, wherein the identifier for a tile comprises a unique tile number for the tile and the image generating component is configured to maintain an indirection index to the frame buffer memory, when storing a tile in the frame buffer memory, by determining a start address of an available storage space for the tile in a pool of storage space allocated for the frame buffer memory and updating a record in the indirection index recording, for the unique tile identifier of the tile, the determined start address, and storing the tile in consecutive memory locations beginning at the determined start address.

32. The image generator according to claim 19, wherein the image rendering component is configured to maintain a frame buffer index, the frame buffer index comprising, for some or all tiles of the image, an indicator of whether or not the tile includes at least one pixel of a non-background colour and, when storing a tile in the frame buffer memory, setting the respective indicator for the tile in the frame buffer index to indicate that the tile comprises at least one pixel of a non-background colour.

33. The image generator according to claim 32, wherein the image rendering component is configured to initialise the indicators in the frame buffer index to indicate that, for every tile of the image, all pixels are of the background colour and the output component is configured to access the frame buffer index to determine which tiles to read from the frame buffer memory and which tiles to set to the background colour.

34. A head-up, head-down, head-mounted or helmet-mounted display system, comprising an image generator according to claim 19.

* * * * *